(12) United States Patent
Kalenborn

(10) Patent No.: US 9,903,325 B2
(45) Date of Patent: Feb. 27, 2018

(54) DUAL FUEL FUEL-INJECTOR

(71) Applicant: L'Orange GmbH, Stuttgart (DE)

(72) Inventor: Markus Kalenborn, Dornstadt (DE)

(73) Assignee: L'Orange GmbH, Stuttgart (DE)

( * ) Notice: Subject to any disclaimer, the term of this patent is extended or adjusted under 35 U.S.C. 154(b) by 0 days.

(21) Appl. No.: 15/392,660

(22) Filed: Dec. 28, 2016

(65) Prior Publication Data

US 2017/0107958 A1  Apr. 20, 2017

Related U.S. Application Data

(63) Continuation of application No. PCT/EP2015/001388, filed on Jul. 8, 2015.

(30) Foreign Application Priority Data

Jul. 19, 2014 (DE) .................. 10 2014 010 717

(51) Int. Cl.

| | |
|---|---|
| *F02B 3/00* | (2006.01) |
| *F02M 43/04* | (2006.01) |
| *F02M 47/02* | (2006.01) |
| *F02D 19/06* | (2006.01) |

(52) U.S. Cl.
CPC ......... *F02M 43/04* (2013.01); *F02D 19/0694* (2013.01); *F02M 47/027* (2013.01); *F02M 2200/44* (2013.01)

(58) Field of Classification Search
CPC ............... F02D 41/40; F02D 2041/389; F02D 41/3094; F02M 61/14; F02M 51/061; F02M 51/066
USPC ....... 123/299, 305, 445, 446, 447, 468, 472, 123/478, 480, 490; 239/5, 124, 127, 239/585.1, 585.5, 533.2–533.4, 533.9
See application file for complete search history.

(56) References Cited

U.S. PATENT DOCUMENTS

| | | | |
|---|---|---|---|
| 4,612,898 A | 9/1986 | Steiger et al. | |
| 2014/0196687 A1 | 7/2014 | Coldren et al. | |
| 2016/0245194 A1* | 8/2016 | Kalenborn | F02M 43/04 |
| 2016/0319754 A1* | 11/2016 | Kalenborn | F02M 43/04 |
| 2017/0002780 A1* | 1/2017 | Kalenborn | F02M 63/0045 |
| 2017/0130685 A1* | 5/2017 | Kalenborn | F02M 43/04 |

FOREIGN PATENT DOCUMENTS

WO   2014/106525 A1   7/2014

OTHER PUBLICATIONS

International Search Report dated Aug. 18, 2015 for International Application No. PCT/EP2015/001388 (2 pages).

\* cited by examiner

*Primary Examiner* — John Kwon
(74) *Attorney, Agent, or Firm* — Taylor IP, P.C.

(57) ABSTRACT

The invention relates to a dual-fuel fuel injector that includes a plurality of stroke-controllable gas nozzle needles which are axially movably mounted on the dual fuel fuel-injector in a plurality of respective seats and which are distributed in a circumferential direction of the dual fuel fuel-injector, and a nozzle chamber provided for the plurality of stroke-controllable gas nozzle needles. The nozzle chamber includes a plurality of externally positioned bulges, wherein within each respective cross section of which an inlet cross section of a flow path is defined which can be blocked selectively via a respective stroke-controllable gas nozzle needle of the plurality of stroke-controllable gas nozzle needles to at least one nozzle opening.

20 Claims, 4 Drawing Sheets

DUAL FUEL FUEL-INJECTOR

CROSS REFERENCE TO RELATED APPLICATIONS

This is a continuation of PCT application No. PCT/EP2015/001388, entitled "DUAL FUEL FUEL-INJECTOR", filed Jul. 8, 2015, which is incorporated herein by reference.

BACKGROUND OF THE INVENTION

1. Field of the Invention

The present invention relates to fuel injectors and, more particularly, to a dual fuel fuel-injector. The dual fuel fuel-injector can be used for example with pilot-injection engines, in particular of the type that in addition to pilot-injection operation with burnable fuel (and a diesel or heavy oil pilot-injection) provide a pure diesel or heavy oil operation. Instead of heavy oil bio-oil or bio fuel may be used.

2. Description of the Related Art

Gaseous fuels are increasingly gaining importance in the (large) engine sector, in particular with stationary engines for power generation. Natural gas for example, is ideally suited for economical and environmentally friendly engine operation due to its wide availability and its excellent emission potential compared to diesel fuel.

In order to achieve good 360° coverage in the combustion chamber during the gas injection in gas operation, the gas nozzle openings on a dual fuel fuel-injector can be positioned around the circumference of the same, in an arrangement that provides delivery of the fuel gas with a distinct radial directional component.

What is needed in the art is a dual fuel fuel-injector that, while being structurally simplified favors a fuel delivery having a radial directional component, with increased flow control.

SUMMARY OF THE INVENTION

The present invention provides a dual fuel fuel-injector which may be used with a first fuel in the form of a liquid fuel, for example diesel fuel, bio fuel or heavy oil and in addition for use with a second fuel in the form of gaseous fuel, for example natural gas. The dual fuel fuel-injector can be provided for pilot-injection operation (liquid fuel pilot-injection for ignition of the gaseous fuel), and in addition for a pure liquid fuel operation. The dual fuel fuel-injector can be used, for example, with a large engine, for example in a motor vehicle such as a ship or a utility vehicle, or in a stationary device, for example for a cogeneration unit, for an (emergency) power generator, for example also for industrial applications.

The dual fuel fuel-injector according to the invention includes stroke-controllable gas nozzle needles which are axially movably mounted on the dual fuel fuel-injector in respective seats and which are distributed in a circumferential direction of the dual fuel fuel-injector. The gas nozzle needles are indirectly controllable, for example according to the already known principle of stroke control via a control chamber and a pilot valve.

The dual fuel fuel-injector furthermore includes one, for example a single (gas) nozzle chamber that is provided for the gas nozzle needles. In this respect the nozzle chamber is a common nozzle chamber for the gas nozzle needles, for example a common nozzle chamber for the entirety of gas nozzle needles. The nozzle chamber can be an annulus and moreover a nozzle chamber that also extends in circumferential direction of the dual fuel fuel-injector. The nozzle chamber is moreover provided in a nozzle module of the dual fuel fuel-injector, for example near a nozzle arrangement of the dual fuel fuel-injector.

Via the gas nozzle needles that are distributed in the circumferential direction and the associated common nozzle chamber, burnable fuel (e.g. highly pressurized burnable fuel) introduced into the nozzle chamber, for example introduced via a high pressure gas channel or respectively a gas supply line of the dual fuel fuel-injector can be delivered from the injector, for example within the framework of a burnable fuel injection, at an intended good 360° coverage; in other words, when the gas nozzle needles are opened and thus flow paths to (gas) nozzle openings downstream from the nozzle chamber of the injector or respectively its (gas) nozzle arrangement are activated.

The nozzle chamber according to the invention is in this respect a common chamber that is provided on the dual fuel fuel-injector for the nozzle needles into which burnable fuel is introduced via a high pressure channel and from which burnable fuel is delivered via a gas nozzle arrangement of the dual fuel fuel-injector.

According to the present invention the nozzle chamber includes externally positioned bulges, within the respective cross section of which an inlet cross section of a flow path which can be blocked selectively via the respective gas nozzle needle to at least one nozzle opening is defined. The inlet cross section also can be defined inside a valve seat of a respective gas nozzle needle, or more specifically by a nozzle valve formed therewith, and the valve seat.

Via this arrangement according to the invention—wherein a directional component directed radially outward from the nozzle chamber and also an increased velocity component, equally directed radially outward is imposed by the bulges upon a fuel (burnable fuel) flowing via nozzle chamber into the inlet cross section—the incoming flow into the flow path (via the inlet cross section) toward the nozzle opening is successfully optimized for an intended delivery of the burnable fuel having a clearly emerging radial directional component, thus achieving favorable flow control toward the (downstream from the respectively arranged) nozzle openings. Thus, a respective bulge within the context of the invention is suited to bringing together partial burnable fuel streams which—viewed in the circumferential direction—move from two opposite sides of the nozzle chamber towards the inlet cross section in the bulge, by creating the intended radially outward directed directional component and increased flow speed via the bulge.

In the dual fuel fuel-injector, the flow paths (formed i.e. by bore segments) extend—from the respective inlet cross section toward the respective at least one nozzle opening—in one direction, whose radial component corresponds with a radial directional component of an inflow into the inflow cross section that is achieved through the bulge. In other words, so that only a small or minimal redirection of the flow that is directed along the flow path is necessary, that is again favoring the flow conditions and reducing the turbulences. The respective flow path, originating from the nozzle can be directed with continuously increasing distance from the same, radially outward toward the nozzle opening.

Additional embodiments of the dual fuel fuel-injector moreover provide, for example, that the respective inlet cross section is arranged radially and distally in the bulge, thereby permitting inflow almost exclusively from a radially internal side; consequently the respective inlet cross section allows low asymmetrically via the bulge. This effectively avoids flow formation at the respective inlet cross section acting against the radially outward directed directional components.

Within the scope of the current invention a flow conducting inlet geometry can be formed in this respect via the respective bulges, causing inflow to the inlet cross section with radially outward directed directional component. For example, via the respective bulges, an inlet funnel may be shaped toward the inlet cross section, having a funnel cross section tapering radially outward that causes inflow to the inlet cross section with the intended radially outward directed directional component.

In order to promote the inflow into the inlet cross section, the nozzle chamber wall can be designed to form a flow conducting inlet geometry upstream from the bulge. Other arrangements provide, for example, to approximate the shape of the nozzle chamber including the bulges in a radial plane on the outer circumference to the shape of a polygon and/or a square with concave sides (whereby the bulges or respectively the inlet cross sections are arranged quasi at the corners of the polygon, for example in a clover configuration, and whereby the walls of the nozzle chamber form the concave sides). Alternatively it may for example be provided that the shape of the nozzle chamber including the bulges displays externally circumferentially an annular shape (for example circular form) in a radial plane from which protrusions caused by the bulges protrude radially through the bulges. Within the scope of the invention, such respective geometry may be formed in that the axially progressing seats intersect the nozzle chamber by forming—the radial externally positioned—bulges, in other words on the outside circumference.

The invention further includes embodiments wherein the nozzle chamber has a section positioned axially further from the nozzles by means of which nozzle chamber sections that are positioned axially closer to the nozzles on which the bulges are formed, are connected in a communicating manner. This contributes to a uniform gas supply in the nozzle chamber.

The dual fuel fuel-injector according to the present invention may further be designed such that the nozzle chamber is defined by a first and a second nozzle body of the dual fuel fuel-injector. Whereas the first nozzle body seats the gas nozzle needles distributed across its circumferential direction, the second nozzle body can seat a liquid fuel nozzle needle that is mounted axially movable. When assembling the first and second nozzle body into a nozzle body module of the dual fuel fuel-injector, the nozzle chamber can hereby be defined in simplified manner and be formed for example via an annular groove in the first nozzle body and is covered after assembly by the second nozzle body.

Another manufacture is made possible, for example, in that the nozzle chamber is formed by a first nozzle body, which is penetrated over a section by the second nozzle body under definition of the nozzle chamber.

The invention also suggests an internal combustion engine, for example of the type described at the beginning, which includes at least one dual fuel fuel-injector previously most used.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
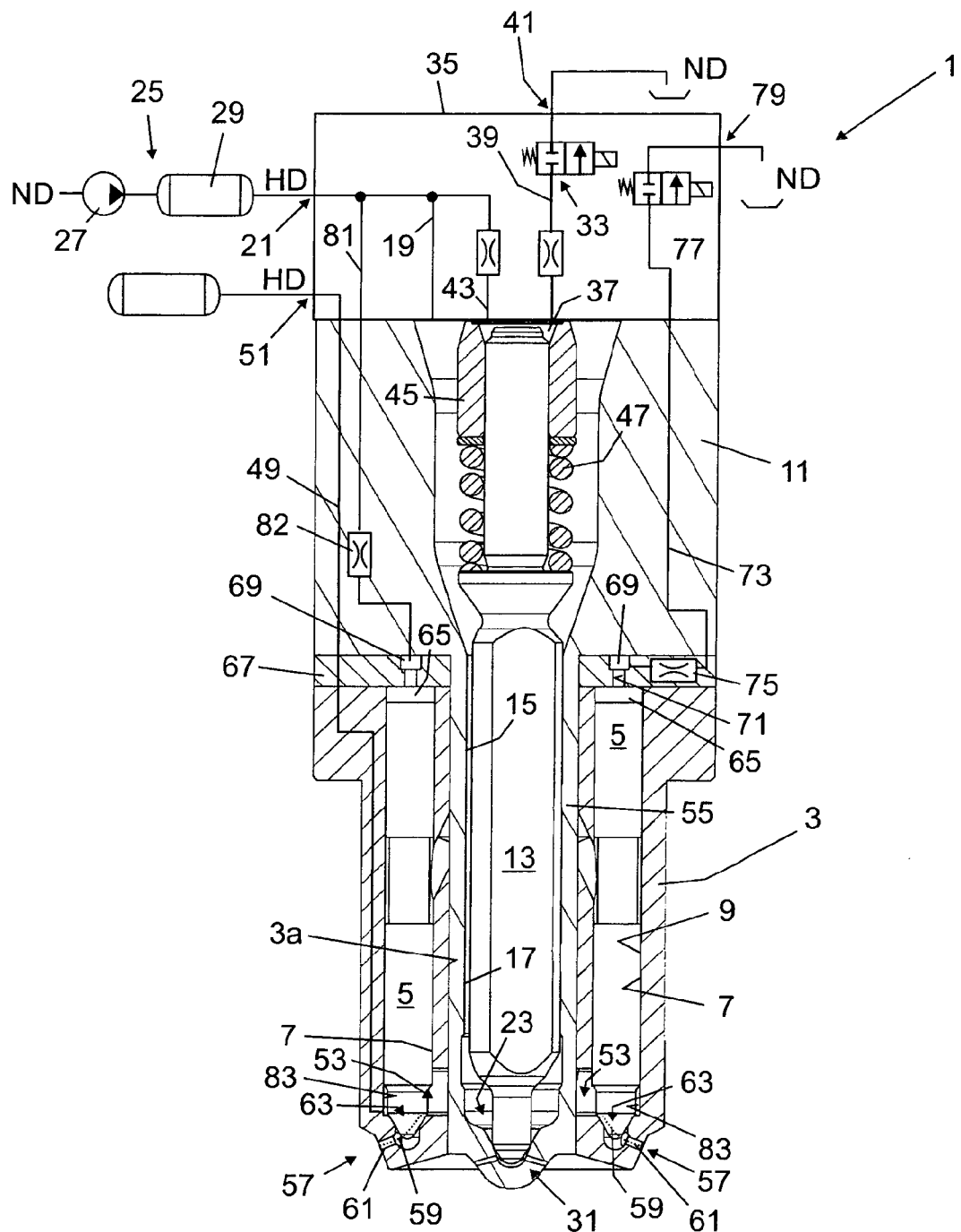
FIG. 1 illustrates a schematic and partially, greatly simplified depiction of a dual fuel fuel-injector according to an embodiment of the invention in a sectional view.

Referring now to FIG. 1 there is shown an inventive dual fuel fuel-injector 1 (dual fuel nozzle or dual fuel injector) that is provided for injection operation with a first, liquid fuel (in particular diesel fuel, bio or heavy oil) as well as for delivery of a second, gaseous fuel (burnable fuel, for example natural gas) for burnable fuel injection. Dual fuel fuel-injector 1 can be used with a dual fuel fuel-injector system, for example with a gas common rail system, for example with an internal combustion engine which is arranged for pilot injection operation (with injected burnable fuel and injected liquid fuel pilot injection) as well as for exclusive liquid fuel operation via dual fuel fuel-injector 1.

Several stroke-controllable (gas) nozzle needles 5 are arranged axially movable in dual fuel fuel-injector 1, in a (first) nozzle body 3 of the same, in other words are provided for selective delivery of a gaseous fuel, for example in the form of burnable fuel. Gas nozzle needles 5 are mounted and piloted in first nozzle body 3, respectively in an associated seat 7 in dual fuel fuel-injector 1, created by a respective axial bore 9 in first nozzle body 3.

Gas nozzle needles 5 are arranged, for example equidistant, and distributed in the circumferential direction of dual fuel fuel-injector 1, or respectively of first nozzle body 3, along a circular path. In the illustrated dual fuel fuel-injector 1 four gas nozzle needles 5 are, for example, arranged in first nozzle body 3, distributed in the circumferential direction, by which advantageously uniform gas delivery into a combustion chamber can be achieved completely around 360°.

Dual fuel fuel-injector 1 moreover includes one (second) nozzle body 11 in which one additional, piston-controllable nozzle needle, or respectively liquid fuel nozzle needle 13 is provided for injection processes that provide selective delivery of a liquid fuel (into a combustion chamber of an internal combustion engine). Liquid fuel nozzle needle 13 is also mounted axially movable in a corresponding seat 15 of dual fuel fuel-injector 1, whereby seat 15 is formed by an axial bore 17 in second nozzle body 11.

A high pressure channel 19 is moreover provided on dual fuel fuel-injector 1 that leads from a liquid fuel inlet 21 of dual fuel fuel-injector 1 to a liquid fuel nozzle chamber 23 in second nozzle body 11. At liquid fuel inlet 21, liquid fuel can be fed by a high pressure (HD) supply device 25 of a fuel injection system, consisting for example of a high pressure pump 27 and a rail 29 and/or also a single pressure accumulator, originating from a liquid fuel storage, for example a tank.

For selective output of liquid fuel, dual fuel fuel-injector 1 is moreover designed to deliver high pressure liquid fuel that—depending on the (stroke) setting of liquid fuel nozzle needle 13—is introduced into liquid fuel nozzle chamber 23 via a liquid fuel nozzle arrangement 31 of dual fuel fuel-injector 1; in an injection operation (for example pure liquid fuel operation or pilot-injection operation) designed to inject into a combustion chamber of an internal combustion engine.

With regard to the stroke control of liquid fuel nozzle needle 13, dual fuel fuel-injector 1 may be provided as an indirectly actuated injector 1—as illustrated in FIG. 1, with a pilot valve or servo valve 33 that can be controlled by a solenoid actuator (or for example a piezo actuator). A control chamber 37 of dual fuel fuel-injector 1 that is associated with liquid fuel nozzle needle 13 can be relieved depending upon valve position via pilot valve 33 that is accommodated with its actuator system in an injector housing 35, in particular via a leakage flow path 39 of the injector-internal fuel system. Originating from control chamber 37, leakage flow path 39 leads to a leakage outlet 41 on the low pressure side of dual fuel-injector 1, that is via pilot valve (by throttling) 33, for example to a leakage collecting tank.

In addition, a high pressure path 43 of the injector-internal fuel system (with throttling) leads to control chamber 37 for liquid fuel nozzle needle 13, through which control chamber 37 originating from high pressure channel 19 is chargeable—via highly pressurized liquid fuel. Control chamber 37 is defined via a needle guide sleeve 45 (and injector housing 35). The needle guide sleeve 45 is accommodated in second nozzle body 11, at the end located away from the nozzle of axial bore 17, whereby moreover a closing spring 47 can be arranged in axial bore 17 which pushes second nozzle needle 13 into the closed position, in other words against a valve seat or nozzle needle seat adjacent to liquid fuel nozzle arrangement 31.

In order to deliver liquid fuel in a liquid fuel fuel-injection operation through liquid fuel nozzle arrangement 31—for example via liquid fuel nozzle chamber 23—the (closing) balance of power at liquid fuel nozzle needle 13 can be terminated through relief of control chamber 37 via pilot valve 33 (leakage flow path 39 open), so that liquid fuel nozzle needle 13 can lift off the valve seat and can open the flow path to the spray holes of liquid fuel nozzle arrangement 31. In order to close the nozzle valve, pilot valve 33 is switched to the blocked position (see FIG. 1), following which the pressure in control chamber 37 is again built up via high pressure path 43 and liquid fuel nozzle needle 13 returns into the needle seat aided by the closing spring force.

In the present embodiment, liquid fuel is preferred to charge and relieve control chamber 37 or for (hydraulic) stroke control of liquid fuel nozzle needle 13.

For operation with gaseous fuel (natural gas, bio gas, etc.), dual fuel fuel-injector 1 includes a gas high pressure channel 49 that leads from burnable fuel inlet 51 on dual fuel fuel-injector 1 to a nozzle chamber, or gas nozzle chamber 53 for the gas-nozzle needles 5; that is to a common nozzle chamber 53 for the plurality of gas-nozzle needles 5. Nozzle chamber 53 is defined by a annular grove (on an internal circumferential surface 3A) introduced into first nozzle body 3 (circular cross section) that is closed by a section 55 of second nozzle body axially connecting a first nozzle body 3 through the formation of an annulus or respectively nozzle chamber 53.

From nozzle chamber 53 highly pressurized burnable fuel that is introduced into nozzle chamber 53 via high pressure gas channel 49 can be delivered i.e. at a pressure level of up to approx. 350 bar depending on the stroke position of gas nozzle needle 5, that is through a gas nozzle arrangement 57 of dual fuel fuel-injector 1. A respective flow path 59 (indicated by a dashed line) leading from gas nozzle chamber 53 to at least one (gas) nozzle opening 61 associated with gas nozzle needle 5 of gas nozzle arrangement 57 of dual fuel fuel-injector 1 can hereby be selectively closed via a respective gas nozzle needle 5 by an open/closed control of an inlet cross section 63 of flow path 59. For example, one or two gas nozzle openings 61 can be assigned to a respective gas nozzle needle 5 or flow path 59.

The stroke control of gas nozzle needles 5 can occur analog with dual fuel fuel-injector 1 illustrated in FIG. 1 according to the operating principle described previously for stroke control of liquid fuel nozzle needle 13, that is in the course of an indirect control of the gas nozzle needles 5.

As illustrated in FIG. 1, each gas nozzle needle 5—for the purpose of stroke control of the same—has allocated to it a control chamber 65 with a control fluid. The control fluid for indirect control of gas nozzle needles 5—as is the case for liquid fuel nozzle needle 13—is the liquid fuel that is supplied to dual fuel fuel-injector 1 via liquid fuel inlet 21.

Favoring a simplified control of gas nozzle needles 5, dual fuel fuel-injector 1 moreover includes a control channel 69—provided on intermediate plate 67—that can be provided as a pre-control chamber for the gas nozzle needles 5 and which can be charged and relieved via the control fluid (liquid fuel). Control chambers 65 for first nozzle needles 5 are connected in a communicating manner with control channel 69, that is, in each case via an inlet throttle device, for example, by a throttle bore 71. An outlet branch 73 for relief of control channel 69, and consequently for common relief of control chambers 65 of gas nozzle needles 5 can be routed on the side of control channel 69 via an outlet throttle device 75 toward the low pressure side (ND).

In addition to the stroke control of gas nozzle needle 5 via selective relief of control channel 69 or respectively control chambers 65 of first nozzle needles 51—analog to the liquid fuel operation—an additional pilot valve (control valve) 77 may be provided on dual fuel fuel-injector 1. Additional pilot valve 77 (including its actuators) is also accommodated in injector housing 35. Depending on the valve position of additional pilot valve 77, control channel 69 can be discharged via control fluid outlet 73 which is controlled via additional pilot valve 77, that is to low pressure side (ND) leakage outlet 79, for example to a leakage collection tank.

In order to now deliver burnable fuel for a burnable fuel injection operation, via gas nozzle arrangement 57, i.e. via chamber 53, the (closing) balance of power on a respective gas nozzle needle 5 can be terminated through relief of control channel 69 and to that extent of connected communicating control chamber 65 for gas nozzle needle 5 via additional pilot valve 77 (outlet 73 open), so that respective gas nozzle needle 5 can lift off a valve seat and can open inlet cross section 63 or respectively flow part 59 to an associated nozzle opening 61 of gas nozzle arrangement 57.

To control gas nozzle needles 5 in their closed position, pilot valve 77 is switched into locked position (FIG. 1), as a consequence of which the pressure in control channel 69 and in this respect, the connected communicating control chamber 65 for gas nozzle needle 5 builds up again via a liquid fuel high pressure path 81 with an infeed throttle 82, and respective gas nozzle needle 5 returns to the needle seat and consequently blocks inlet cross section 63 or respectively flow path 59.

Flow paths 59 that allow inflow via respective inlet cross sections 63 are positioned radially outward on dual fuel fuel-injector 1, originating from nozzle chamber 53 toward nozzle openings 61 (FIG. 1), so that an intended burnable fuel injection into a combustion chamber can be achieved with a clearly radial component.

In order to support the inflow and through-flow of a respective radially outward oriented flow path 59, and in order to impose upon the flow in the associated inlet cross section 63 for example outward directed directional component, corresponding with the radial direction component of flow paths 59 as well as to impose in particular an increased flow speed, nozzle chamber 53 of the inventive dual fuel fuel-injector 1 has radially outward directed bulges 83, within the respective cross section of which an inlet cross section 63 of a flow path 59 which can be selectively blocked via respective gas nozzle needle 5 to at least one (downstream) nozzle opening 61 is defined. This is explained in further detail with reference to FIGS. 2-4 for dual fuel fuel-injector 1 according to FIG. 1.

Figure 2:
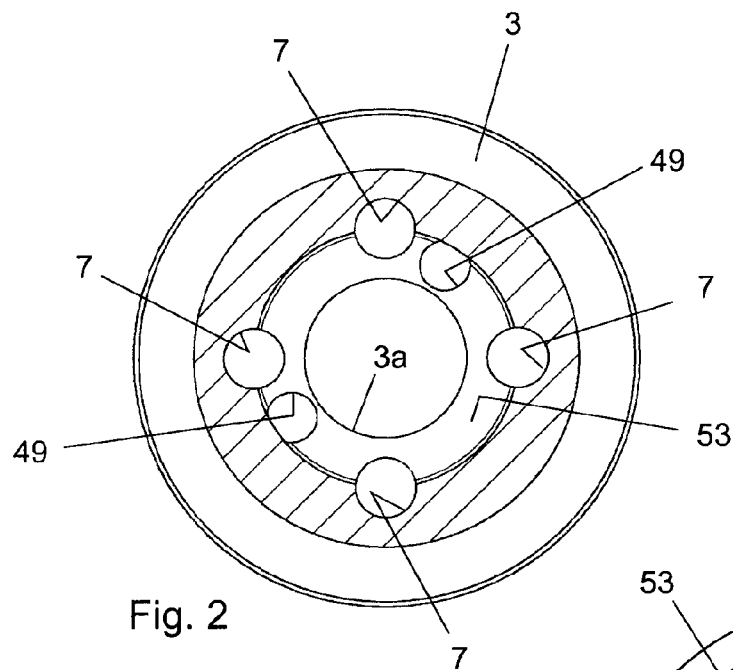
FIG. 2 is a schematic sectional view of a first nozzle body of the dual fuel fuel-injector according to the embodiment as shown in FIG. 1.

FIG. 2 illustrates first nozzle body 3, that has an annular cross section, in a radial sectional view, in other words with the view of the end away from the nozzle. As shown, gas high pressure channels 49 that are provided for burnable fuel supply into nozzle chamber 53 in first nozzle body 3, as well as radially located external seats 7 that intersect nozzle chamber 53 due to formation of inventive bulges 83, are each in the embodiment of bores.

Figure 3:
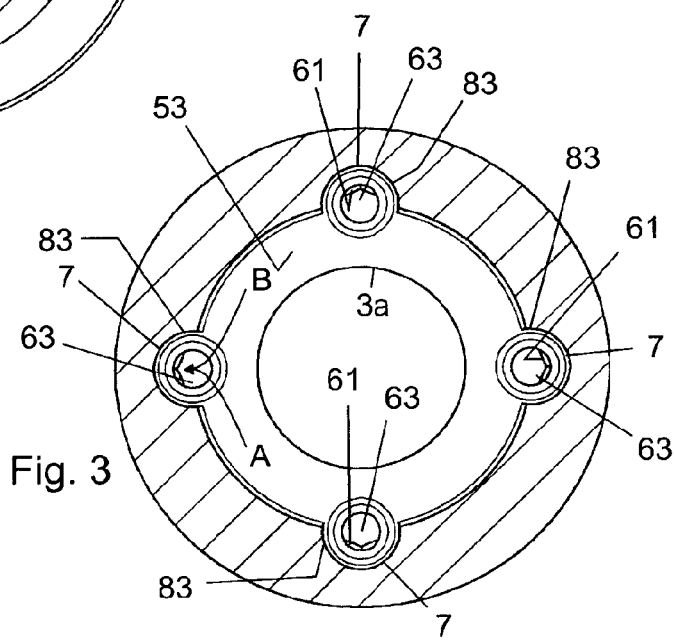
FIG. 3 is a schematic sectional view of a first nozzle body as shown in FIG. 1, in particular the nozzle chamber including bulges is illustrated in closer detail.

FIG. 3 illustrates a radial section of first nozzle body 3 cut through nozzle chamber 53 with a view toward the nozzle-near end. As indicated by arrows A and B, a respective inlet cross section 63 that is formed at a respective bulge 83—and especially arranged radially distal therein—is subject to asymmetric inflow (gas nozzle needle 5). In connection with this inflow a greater volume flow occurs at the radial internal side of the inlet cross section and by contrast a clearly lesser volume flow occurs on the radial external side of the inlet cross section. Consequently a flow of the burnable fuel occurs onto which an increased radially outward directed velocity component in addition to a radially outward directed directional component is imposed. A respective bulge 83 acts herein as flow conducting inlet geometry that merges burnable fuel partial flows A and B from opposite circumferential directions at inlet cross section 63 of bulge 83.

Figure 4:
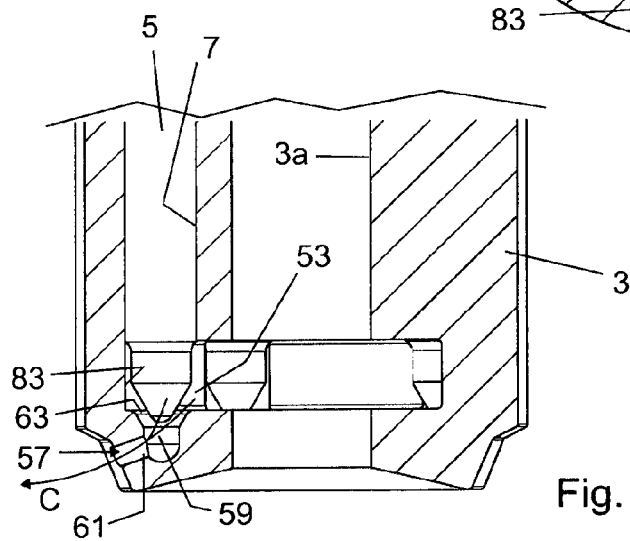
FIG. 4 is a schematic section view through the nozzle-near end of the nozzle body according to FIGS. 1-3 with gas nozzle needles arranged therein.

FIG. 4 illustrates a sectional view through nozzle body 3 including nozzle needles 5, and more closely shows the geometry of a respective flow path 59, whereby an inlet cross section 63 is shown with open flow path 59. Furthermore, inflow into inlet cross section 63 and flow through flow paths 59 is outlined by arrow C.

As is shown in FIG. 4, a first section of flow path 59 is formed downstream of a respective inlet cross section 63, for example by an axial blind hole that continues seat 7 toward the nozzle-near end. From the blind hole a second section of flow path 59 branches off as a radial outward oriented nozzle opening 61, so that the progression of flow path 59 overall is diagonally oriented, that is with axial a well as also defined radial directional component. As shown by arrow C, due to the flow-supporting bulge 83, an almost one-sided inflow can be achieved with the radial directional component of the progression of flow path 59, so that the inflow into inlet cross section 63 at the location of the valve seat is less turbulent, consequently resulting in fewer losses and the stream pattern—especially in the build-up phase of the stream—is less disturbed.

Figure 5:
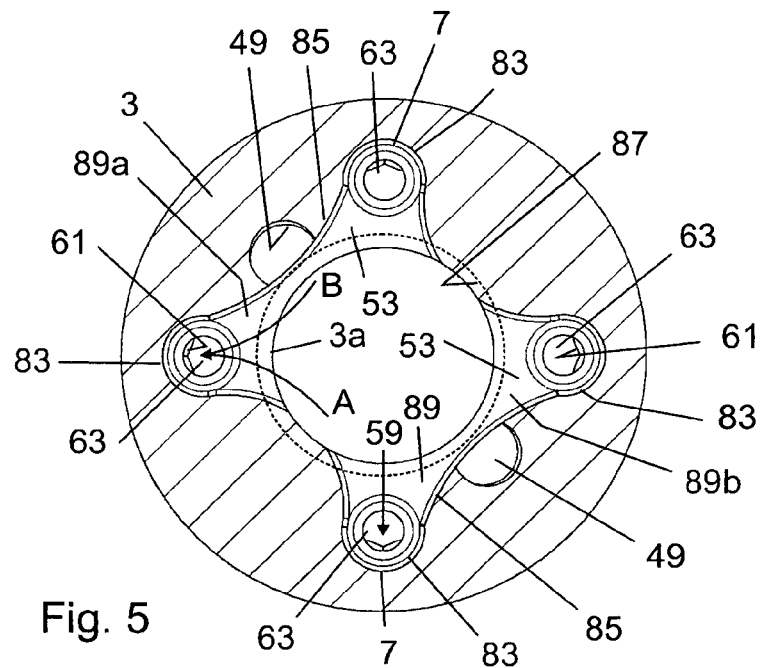
FIG. 5 is a schematic sectional view of a first nozzle body of a dual fuel fuel-injector according to another embodiment of the invention.
Figure 6:
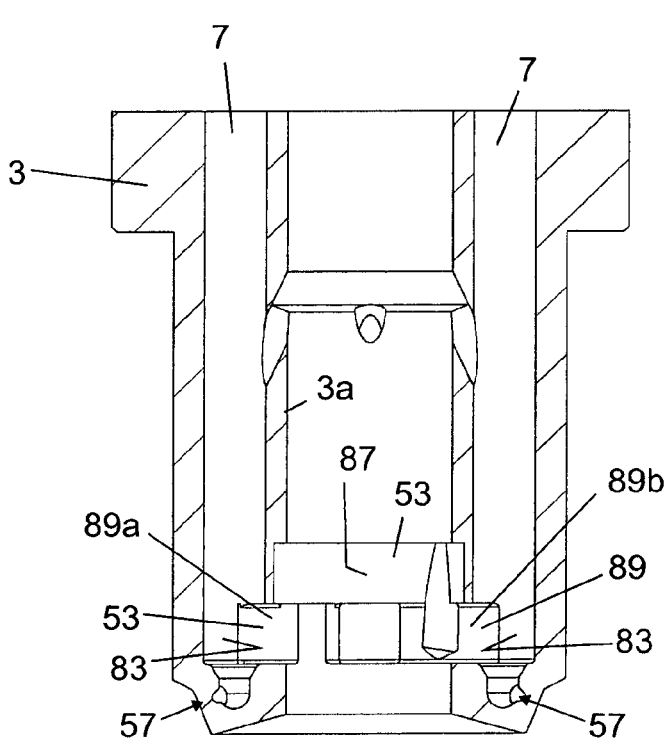
FIG. 6 is a schematic sectional view of the nozzle body as shown in FIG. 5.

FIGS. 5 and 6 are sectional illustrations of a nozzle body 3 of a dual fuel fuel-injector 1 according to an additional embodiment.

According to FIG. 5 the shape of nozzle chamber 53 on its outside circumference is herein approximated to the shape of a polygon with concave sides 85, whereby bulges 83 or inlet cross sections 63 are disposed on the corners of the polygon with seats 7 intersecting nozzle chamber 53. Via concave sides 85 on both sides of a respective bulge 83, improved flow-conducting inlet geometry is created that quasi represents an inlet funnel causing an inflow into inlet cross section 63 with the intended radial outward directed directional component.

The embodiment as shown in FIGS. 5 and 6 has the nozzle chamber 53 and includes an axial segment 87 remote from the nozzle, by means of which axially closer nozzle chamber segments 89 that are separated from one another and on which bulges 83 are formed are connected in a communicating manner. Nozzle-near nozzle chamber segments 89 are in the embodiment of two chambers 89A and 89B located and separated from one another over their axial progression, that however communicate via nozzle segment 87 which is located remote from the nozzle (cross section of the same is indicated by the dashed line in FIG. 5). Communication connection 87 for homogeneous gas distribution through these chambers 89A, 89B can—as illustrated in FIG. 6—be realized for example by a continuous groove that, in the present embodiment is formed for example as a turned groove on the inside diameter of first nozzle body 3.

Figure 7:
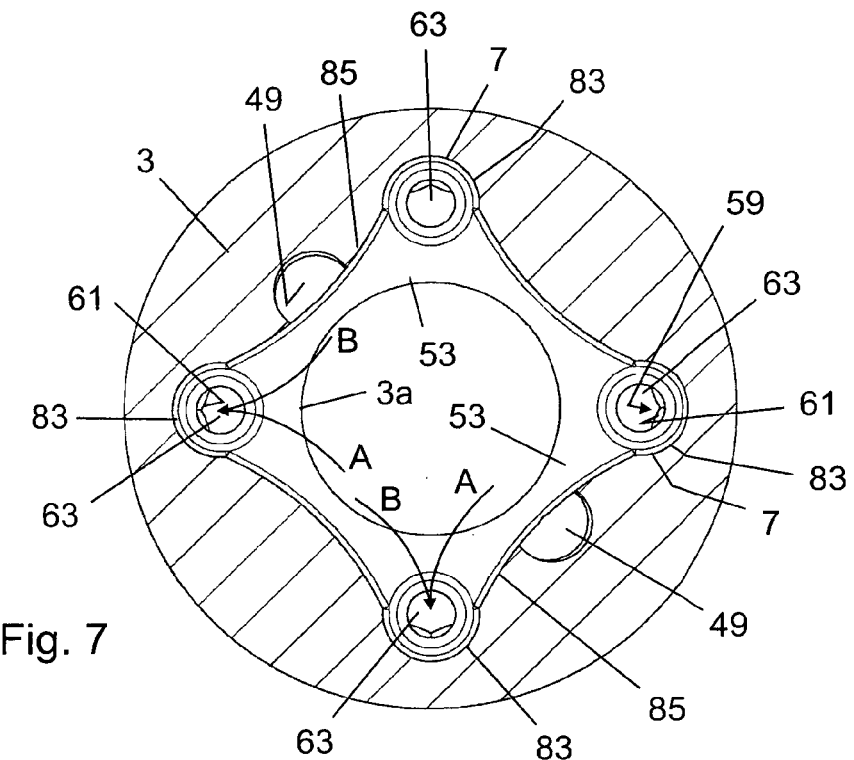
FIG. 7 is a sectional view of a first nozzle body of the dual fuel fuel-injector according to another embodiment of the invention.
Figure 8:
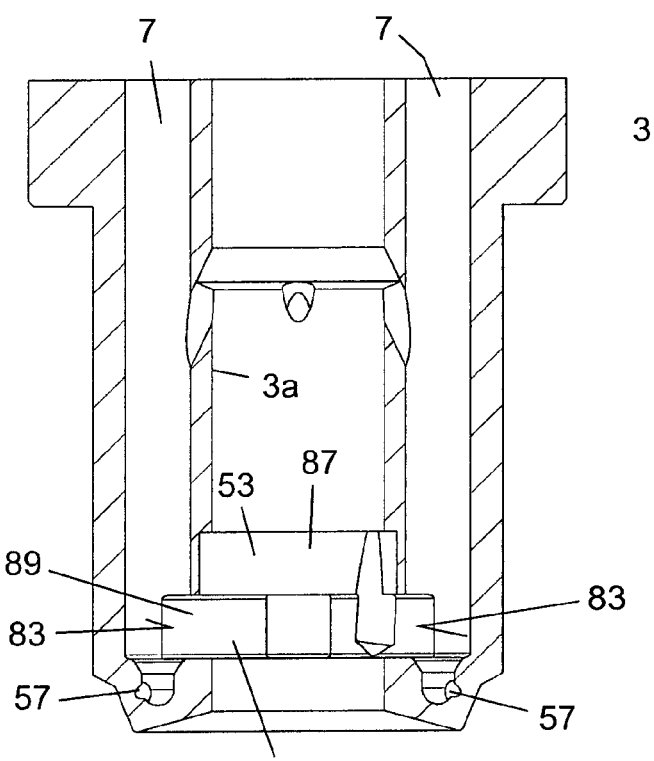
FIG. 8 is a sectional view of the nozzle body as shown in FIG. 7.

FIGS. 7 and 8 illustrate side views of an additional first nozzle body 3 of a dual fuel fuel-injector 1 according to the invention. Nozzle body 3 comprises a nozzle chamber 53, whose geometry is approximated to that of nozzle chamber 53 in FIGS. 5 and 6, that is to the shape of a polygon with concave sides 85. Nozzle chamber 53 in the plane of bulges 83 is not divided into separate chambers, but is designed continuous in the circumferential direction, or respectively annular. In order to reliably realize homogeneous gas distribution, also through the constrictions caused by concave sides 85, a measure to increase the nozzle chamber volume can also be provided with such an embodiment, i.e. again in the form of a turned groove that is disposed remote from the nozzles on nozzle chamber 53.

The embodiments according to FIGS. 5-8 allow for a flow-favorable guidance of the burnable fuel to the inlet cross sections. Similarly effective inlet geometries can result in addition also with radial nozzle chamber shapes, as contemplated by the present invention.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A dual fuel fuel-injector, comprising:
a plurality of stroke-controllable gas nozzle needles which are axially movably mounted on the dual fuel fuel-injector in a plurality of respective seats and which are distributed in a circumferential direction of the dual fuel fuel-injector; and
a nozzle chamber provided for the plurality of stroke-controllable gas nozzle needles, the nozzle chamber including a plurality of externally positioned bulges, wherein within a respective cross section of said externally positioned bulges an inlet cross section of a flow path is defined, said flow path leading from the nozzle chamber to at least one nozzle opening, and said flow path is blocked selectively via a respective stroke-controllable gas nozzle needle of said plurality of stroke-controllable gas nozzle needles.

2. The dual fuel fuel-injector according to claim 1, wherein at least one of a directional component directed radially outward from said nozzle chamber is imposed by a respective bulge of said plurality of externally positioned bulges on a fuel flowing via said nozzle chamber into the inlet cross section and an increased velocity component directed radially outward is imposed by a respective bulge of said plurality of externally positioned bulges on a fuel flowing via said nozzle chamber into the inlet cross section.

3. The dual fuel fuel-injector according to claim 1, wherein a respective flow path extends in one direction, whose radial component corresponds with a radial directional component of an inflow into the inlet cross section that is achieved via a respective bulge of said plurality of externally positioned bulges.

4. The dual fuel fuel-injector according to claim 1, wherein at least one of a respective inlet cross section receives inflow via a respective bulge of said plurality of externally positioned bulges at a radially internal side, a respective inlet cross section receives an asymmetric inflow via a respective bulge of said plurality of externally positioned bulges, and a respective inlet cross section is arranged radially distally in a respective bulge of said plurality of externally positioned bulges.

5. The dual fuel fuel-injector according to claim 1, wherein a respective flow path, originating from said nozzle chamber, is directed with a continuously increasing distance from said nozzle chamber, radially outward toward said at least one nozzle opening.

6. The dual fuel fuel-injector according to claim 1, wherein at least one of a flow conducting inlet geometry is formed by a respective bulge of said plurality of externally positioned bulges, causing an inflow to said inlet cross section with a radially outward directed directional component and an inlet funnel is shaped by a respective bulge of said plurality of externally positioned bulges, causing an inflow to said inlet cross section with the radially outward directed directional component.

7. The dual fuel fuel-injector according to claim 1, wherein at least one of a shape of said nozzle chamber including said plurality of externally positioned bulges, in a radial plane on an outer circumference, is approximated to the shape of a polygon with concave sides and a shape of said nozzle chamber including said plurality of externally positioned bulges displays externally circumferentially an annular shape in a radial plane from which a plurality of protrusions caused by the plurality of externally positioned bulges protrude radially through the plurality of externally positioned bulges.

8. The dual fuel fuel-injector according to claim 1, wherein said nozzle chamber has an axial segment remote from a nozzle, by which a plurality of axially closer nozzle chamber segments on which said plurality of externally positioned bulges are formed are communicatively connected.

9. The dual fuel fuel-injector according to claim 1, wherein said plurality of respective seats intersects said nozzle chamber by forming said plurality of externally positioned bulges.

10. The dual fuel fuel-injector according to claim 1, wherein at least one of said nozzle chamber is defined by a first and a second nozzle body of the dual fuel fuel-injector and said nozzle chamber is formed by a first nozzle body, which is penetrated over a section by a second nozzle body under definition of said nozzle chamber.

11. An internal combustion engine, comprising:
a dual fuel fuel-injector, including:
a plurality of stroke-controllable gas nozzle needles which are axially movably mounted on the dual fuel fuel-injector in a plurality of respective seats and which are distributed in a circumferential direction of the dual fuel fuel-injector; and
a nozzle chamber provided for the plurality of stroke-controllable gas nozzle needles, the nozzle chamber includes a plurality of externally positioned bulges, wherein within a respective cross section of said externally positioned bulges an inlet cross section of a flow path is defined, said flow path leading from the nozzle chamber to at least one nozzle opening, and said flow path is blocked selectively via a respective stroke-controllable gas nozzle needle of said plurality of stroke-controllable gas nozzle needles.

12. The internal combustion engine according to claim 11, wherein at least one of a directional component directed radially outward from said nozzle chamber is imposed by a respective bulge of said plurality of externally positioned bulges on a fuel flowing via said nozzle chamber into the inlet cross section and an increased velocity component directed radially outward is imposed by a respective bulge of said plurality of externally positioned bulges on a fuel flowing via said nozzle chamber into the inlet cross section.

13. The internal combustion engine according to claim 11, wherein a respective flow path extends in one direction, whose radial component corresponds with a radial directional component of an inflow into the inlet cross section that is achieved via a respective bulge of said plurality of externally positioned bulges.

14. The internal combustion engine according to claim 11, wherein at least one of a respective inlet cross section receives inflow via a respective bulge of said plurality of externally positioned bulges at a radially internal side, a respective inlet cross section receives an asymmetric inflow via a respective bulge of said plurality of externally positioned bulges, and a respective inlet cross section is arranged radially distally in a respective bulge of said plurality of externally positioned bulges.

15. The internal combustion engine according to claim 11, wherein a respective flow path, originating from said nozzle chamber, is directed with a continuously increasing distance from said nozzle chamber, radially outward toward said at least one nozzle opening.

16. The internal combustion engine according to claim 11, wherein at least one of a flow conducting inlet geometry is formed by a respective bulge of said plurality of externally positioned bulges, causing an inflow to said inlet cross section with a radially outward directed directional component and an inlet funnel is shaped by a respective bulge of said plurality of externally positioned bulges, causing an inflow to said inlet cross section with the radially outward directed directional component.

17. The internal combustion engine according to claim 11, wherein at least one of a shape of said nozzle chamber including said plurality of externally positioned bulges, in a radial plane on an outer circumference, is approximated to the shape of a polygon with concave sides and a shape of said nozzle chamber including said plurality of externally positioned bulges displays externally circumferentially an annular shape in a radial plane from which a plurality of protrusions caused by the plurality of externally positioned bulges protrude radially through the plurality of externally positioned bulges.

18. The internal combustion engine according to claim 11, wherein said nozzle chamber has an axial segment remote from a nozzle, by which a plurality of axially closer nozzle chamber segments on which said plurality of externally positioned bulges are formed are communicatively connected.

19. The internal combustion engine according to claim 11, wherein said plurality of respective seats intersects said nozzle chamber by forming said plurality of externally positioned bulges.

20. The internal combustion engine according to claim 11, wherein at least one of said nozzle chamber is defined by a first and a second nozzle body of the dual fuel fuel-injector and said nozzle chamber is formed by a first nozzle body, which is penetrated over a section by a second nozzle body under definition of said nozzle chamber.

\* \* \* \* \*